United States Patent
Chun et al.

(10) Patent No.: US 10,000,420 B2
(45) Date of Patent: Jun. 19, 2018

(54) CERAMIC MATERIAL AND CUTTING TOOLS MADE THEREOF

(71) Applicant: TaeguTec, Ltd., Dalseong-gun, Daegu (KR)

(72) Inventors: Sung Su Chun, Daegu (KR); Dae Yeop Lee, Daegu (KR); Geun Ho Park, Daegu (KR); Chang Hoon Hong, Daegu (KR)

(73) Assignee: TaeguTec, Ltd., Dalseong-gun, Daegu (KR)

(*) Notice: Subject to any disclaimer, the term of this patent is extended or adjusted under 35 U.S.C. 154(b) by 0 days. days.

(21) Appl. No.: 15/522,007

(22) PCT Filed: Nov. 13, 2015

(86) PCT No.: PCT/KR2015/012203
§ 371 (c)(1),
(2) Date: Apr. 26, 2017

(87) PCT Pub. No.: WO2016/076656
PCT Pub. Date: May 19, 2016

(65) Prior Publication Data
US 2017/0334790 A1    Nov. 23, 2017

(30) Foreign Application Priority Data
Nov. 13, 2014 (KR) ........................ 10-2014-0158277

(51) Int. Cl.
*C04B 35/597* (2006.01)
*B23B 27/14* (2006.01)

(52) U.S. Cl.
CPC .......... *C04B 35/597* (2013.01); *B23B 27/148* (2013.01); *B23B 2222/64* (2013.01); *B23B 2226/18* (2013.01); *C04B 2235/3206* (2013.01); *C04B 2235/3217* (2013.01); *C04B 2235/3225* (2013.01); *C04B 2235/3865* (2013.01)

(58) Field of Classification Search
CPC .................................................. B23B 27/148
See application file for complete search history.

(56) References Cited

U.S. PATENT DOCUMENTS

| | | | |
|---|---|---|---|
| 4,818,635 A * | 4/1989 | Ekstrom | C04B 35/597 |
| | | | 428/698 |
| 5,110,773 A | 5/1992 | Corral et al. | |
| 5,200,374 A | 4/1993 | Yamada et al. | |
| 7,629,281 B2 | 12/2009 | Östhols | |
| 9,695,087 B2 * | 7/2017 | Toyoda | C04B 35/597 |
| 2016/0207837 A1 * | 7/2016 | Toyoda | B24D 18/0009 |

FOREIGN PATENT DOCUMENTS

| | | |
|---|---|---|
| JP | 2013-224240 | 10/2013 |
| WO | WO 2016/171502 A1 | 10/2016 |

OTHER PUBLICATIONS

International Search Report dated Feb. 22, 2016 issued in counterpart International (PCT) Application (No. PCT/KR2015/012203).
Written Opinion dated Feb. 22, 2016 issued in counterpart International (PCT) Application (No. PCT/KR2015/012203).

* cited by examiner

*Primary Examiner* — Karl E Group
(74) *Attorney, Agent, or Firm* — Womble Bond Dickinson (US) LLP

(57) ABSTRACT

A ceramic material includes of β-sialon ($Si_{(6-z)}Al_zO_zN_{(8-z)}$), polytype 15R, an intergranular phase, and yttrium. The polytype 15R includes twin grains.

21 Claims, 5 Drawing Sheets

CERAMIC MATERIAL AND CUTTING TOOLS MADE THEREOF

RELATED APPLICATIONS

This is a 35 USC 371 U.S. National Phase of International Application No. PCT/KR2015/012203, filed 2015 Nov. 13 and published as WO 2016/076656A1 on 2016 May 19, which claims priority to Korean application no. 10-2014-0158277, filed 2014 Nov. 13. The contents of the aforementioned applications are incorporated by reference in their entirety.

TECHNICAL FIELD

The present disclosure relates to a silicon nitride ceramic material having wear resistance and toughness suitable for machining heat resistant super alloy (HRSA), and a cutting tool made of the same.

BACKGROUND ART

The high hot hardness of a ceramic material allows the ceramic material for cutting tools to be an appropriate choice for machining a workpiece which has high hardness, high tensile strength and low thermal expansion at elevated temperature, and it is particularly suitable for a self-hardening material such as nickel- or cobalt-based material which is often used for the heat resistant super alloy (HRSA).

Many nitride silicon materials for cutting tools are fabricated using aluminum oxide $Al_2O_3$ as a sintering additive. Because aluminum and oxygen can replace the silicon and nitrogen in silicon nitride crystal structure respectively, these can form so-called "sialon" ceramic. The sialon ceramic consists of silicon, aluminum, oxygen and nitrogen (Si—Al—O—N) and can sometimes be additionally stabilized by cation (Me), in which $Me^{n+}$ may refer to a material having proper ion radius (r<1.0 Å) with a plurality of rare earth metals, and may be selected from lanthanide such as Y, Yb, Dy, Lu, Li, Ca, Mg, Sc, for example.

Referring to "Progress in SiAlON ceramics" by Izhevskyi V A, Genova L A, Bressiani J C, and Aldinger F (J. Eur. Ceram. Soc. 20, 2275-2295(2000)), among a large number of sialon phases detected and characterized, the main phase for use in cutting tools remains in α-sialon phase, i.e., in $R_xSi_{12-(m+n)}Al_{(m+n)}O_nN_{(16-n)}$ (1.0<m<2.7; n<1.2) state, in which R is one of the above-mentioned metals or the lantanoide having smaller ion radius than 1.0 Å, and β-sialon is $Si_{6-z}Al_zO_zN_{(8-z)}$ (0<z<4.2).

During sintering, the materials such as silicon nitride, alumina, AlN or a number of materials such as 12H, 21R used as a sialon polyphase (or polytype) composition temporarily form a molten material with lanthanoid or metal, or with lantanoid oxide. From this molten material, α- and β-sialon phases (if Y is used as metal ion R described above), and possibly, different phases such as YAG, melilite, B-phase, 12H and so on are crystallized. After sintering, the intergranular phase among crystalline particles remains. The amount of the produced intergranular phase is influenced by the composition of the materials and sintering conditions used.

The metal ion can not only act to stabilize the α-sialon phase, but also act as a catalyst to form sialon crystals during sintering. It usually aids forming of elongated sialon particles in β-phase, but elongated α-sialon particles are also produced. (Refer to "Nucleation and Growth of the Elongated α-SiAlON" by Fang-Fang X, Shu-Lin W, Nordberg L O, Ekstrom T (J. Eur. Ceram. Soc. 17(13) 1631-1638 (1997)).

U.S. Pat. No. 7,629,281 proposes a ceramic material comprising β-sialon, 12H, and intergranular amorphous or partly crystalline phase and yittrium.

PRIOR ART DOCUMENTS

Korean Patent Publication No. 10-2008-0061314

DISCLOSURE OF INVENTION

Technical Problem

An object of the present disclosure is to provide a silicon nitride ceramic material for a metal cutting tool, having wear resistance and toughness suitable for machining heat resistant super alloy (HRSA).

An object of the present disclosure is to provide a cutting tool made of a silicon nitride ceramic material for a metal cutting tool, which has wear resistance and toughness for machining heat resistant super alloy (HRSA).

The objectives that are intended to be addressed by the present disclosure are not limited to that mentioned above, and other objectives that are not mentioned above can be clearly understood to those skilled in the art based on the description provided below.

Solution to Problem

In order to achieve the objects mentioned above, a ceramic material according to an exemplary embodiment consists of β-sialon $(Si_{(6-z)}Al_zO_zN_{(8-z)})$ and polytype 15R and intergranular phase, and contains yittrium, in which the polytype 15R includes twin grains.

In the ceramic material according to an exemplary embodiment, the amount of the polytype 15R is between 25% and 55%, as measured as a ratio of the height in a Cu-Kα X-ray diffraction pattern of 15R peak at a 2θ value of 34° and the height in the same diffraction pattern of the β-sialon peak at a 2θ value of 33°.

Exemplary embodiments of the present disclosure will be described in detail below with reference to the description and the drawings.

Advantageous Effects of Invention

According to exemplary embodiments of the present disclosure, a ceramic material is provided, which has wear resistance and toughness proper for use in a cutting tool to machine heat resistant super alloy (HRSA).

BRIEF DESCRIPTION OF DRAWINGS

The above and other objects, features and advantages of the present disclosure will become more apparent to those of ordinary skill in the art by describing in detail exemplary embodiments thereof with reference to the accompanying drawings, in which.

MODE FOR THE INVENTION

The raw materials used for the preparation of a ceramic material according to an exemplary embodiment and ratios thereof are shown in [Table 1] below. $Y_2O_3$ content and MgO content, which include metal ions for use as a catalyst in the preparation of the ceramic material, are fixed at 4 wt %.

TABLE 1

| | Weight % | | | | |
|---|---|---|---|---|---|
| No | $Si_3N_4$ | MgO | AlN | $Y_2O_3$ | $Al_2O_3$ |
| 1 | 69.99 | | 7.46 | 4.000 | 18.55 |
| 2 | 69.99 | 0.500 | 7.46 | 3.500 | 18.55 |
| 3 | 66.73 | | 10.3 | 4.000 | 18.97 |
| 4 | 63.47 | | 13.14 | 4.000 | 19.39 |
| 5 | 60.2 | | 15.99 | 4.000 | 19.81 |
| 6 | 56.94 | | 18.83 | 4.000 | 20.23 |
| 7 | 53.67 | | 21.68 | 4.000 | 20.65 |
| 8 | 50.41 | | 24.52 | 4.000 | 21.07 |
| 9 | 63.54 | | 9.31 | 4.000 | 23.15 |
| 10 | 63.54 | 0.500 | 9.31 | 3.500 | 23.15 |
| 11 | 60.62 | | 12.05 | 4.000 | 23.33 |
| 12 | 57.69 | | 14.8 | 4.000 | 23.51 |
| 13 | 54.76 | | 17.55 | 4.000 | 23.69 |
| 14 | 48.9 | | 23.05 | 4.000 | 24.05 |
| 15 | 45.97 | | 25.8 | 4.000 | 24.23 |

Powder mixture mixed at wt % according to [Table 1] is added with methanol as a solvent, a dispersant and a binder, and milled with a ball mill for about 20 hr. The raw materials are milled as described above so that a slurry of the raw materials is prepared.

After milling to prepare slurry, the slurry is granulated through a spray dryer. Powder is obtained by passing the granulated raw materials through a sieve.

The obtained powder is compressed into a compact. The compact is subject to debinding, and then sintered and densified during 2 hours of gas pressure sintering at 1680° C.~1820° C.

[Table 2] below shows the ceramic material prepared from the Examples shown in [Table 1] by the procedures described above. Further, the prepared ceramic material was analyzed with the X-ray diffractography.

Figure 1:
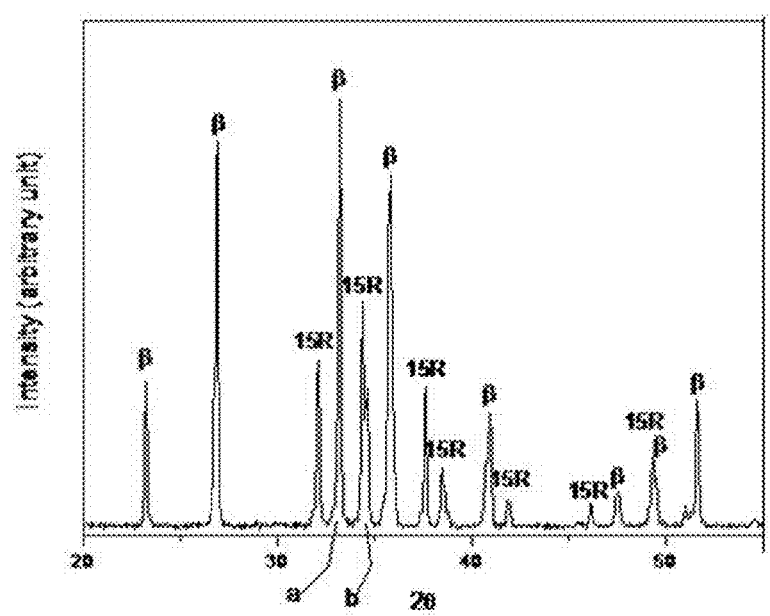
FIG. 1 shows an X-ray diffraction pattern from a ceramic material according to an exemplary embodiment.

FIG. 1 shows an X-ray diffraction pattern from a ceramic material according to an exemplary embodiment. For reference, referring to FIG. 1, (β represents β-sialon ($Si_{6-z}Al_zO_zN_{(8-z)}$), and 15R represents polytype 15R phase. Further, FIG. 1 shows the X-ray diffraction pattern of Example 14 (No. 14) for an example.

TABLE 2

| | z value of β-SiAlON (substitution rate) | | | ratio of |
|---|---|---|---|---|
| No | Za | Zc | average | 15R/beta (%) |
| 1 | 1.45 | 1.46 | 1.46 | 0 |
| 2 | 1.48 | 1.50 | 1.49 | 0 |
| 3 | 1.48 | 1.47 | 1.48 | 4.71 |
| 4 | 1.47 | 1.47 | 1.47 | 9.18 |
| 5 | 1.43 | 1.44 | 1.43 | 19.48 |
| 6 | 1.39 | 1.38 | 1.38 | 30.69 |
| 7 | 1.39 | 1.37 | 1.38 | 39.22 |
| 8 | 1.39 | 1.36 | 1.37 | 51.17 |
| 9 | 1.84 | 1.85 | 1.85 | 0 |
| 10 | 1.89 | 1.90 | 1.90 | 0 |
| 11 | 1.76 | 1.79 | 1.78 | 5.64 |
| 12 | 1.77 | 1.77 | 1.77 | 12.2 |
| 13 | 1.71 | 1.74 | 1.73 | 21.47 |
| 14 | 1.68 | 1.69 | 1.68 | 48.8 |
| 15 | 1.63 | 1.65 | 1.64 | 71.22 |

Referring to FIG. 1, it is noted that the ceramic material according to an exemplary embodiment includes β-sialon, but does not include α-sialon. Further, based on the peak around 34° and a plurality of satellite peaks shown in FIG. 1, it is understood that the ceramic material according to an exemplary embodiment includes the polytype 15R phase.

Further, based on the X-ray diffraction pattern as shown in FIG. 1, a z value of the β-sialon included in the ceramic material prepared according to Examples of the present disclosure can be determined.

Additionally, the amount of the polytype 15R phase can be determined based on the ratio of the height in a Cu-Kα X-ray diffraction pattern of 15R peak at a 2θ value (b) of 34°, and the ratio of the height in a Cu-Kα X-ray diffraction pattern of the β-sialon peak at a 2θ value (a) of 33°.

Figure 2:
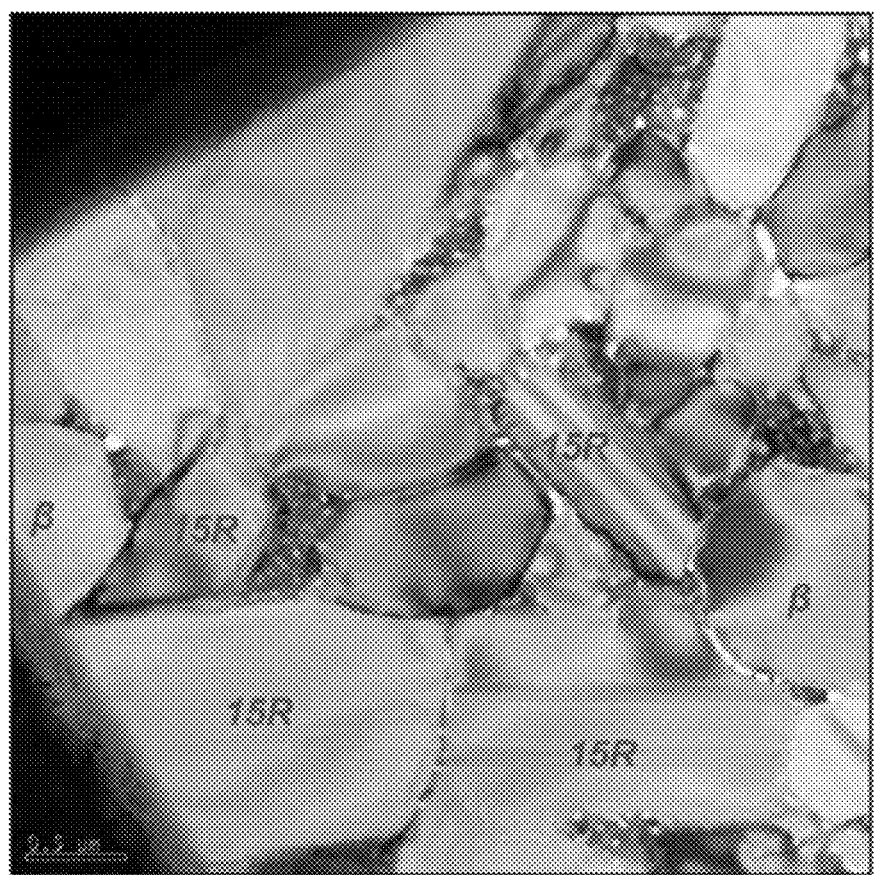
FIG. 2 is a Scanning Electron Microscope (SEM) micrograph of a ceramic material according to an exemplary embodiment.

FIG. 2 is a Scanning Electron Microscope (SEM) micrograph of a ceramic material according to an exemplary embodiment. For reference, FIG. 2 is the SEM micrograph of a sample prepared from Example 14 (No. 14). As shown in FIG. 2, the ceramic material consists of β-sialon, polytype 15R phase, and intergranular phase between β-sialon and polytype 15R phase.

Additionally, referring to FIG. 2, it is noted that the polytype 15R phase includes crystal grains of bright bands and dark bands repeatedly stacked on one another. Such crystal grains may be the twin grains. Accordingly, it is understood that, in the ceramic material according to an exemplary embodiment, the polytype 15R phase may include twin grains.

Among the materials for a ceramic material, Example 2 and Example 10 that include MgO do not form polytype 15R phase. In other words, among Examples 1 to 15, the Examples that form the polytype 15R phase use $Y_2O_3$ as a catalyst.

Accordingly, the ceramic material according to an exemplary embodiment may consist of β-sialon, polytype 15R phase and intergranular phase between β-sialon and polytype 15R phase, and may contain yttrium (Y) which was included in the raw material. Further, in the ceramic material according to an exemplary embodiment, the polytype 15R phase may include twin grains.

<Evaluation 1>

Examples 1 to 16 were tested for Vickers hardness ($H_V$), Rockwell hardness ($H_R$) and fracture toughness ($K_{IC}$), as shown in [Table 3] below. Referring to [Table 3], the unit of the Vickers hardness ($H_V$) is kgf/mm², and the unit of fracture toughness ($K_{IC}$) is Pa·m$^{1/2}$.

TABLE 3

| No | $H_v$ | $H_{Ra}$ | $K_{IC}$ | ratio of 15R/beta (%) |
|---|---|---|---|---|
| 1 | 1535.4 | 93.8 | 3.5 | 0 |
| 2 | 1542.7 | 93.8 | 3.42 | 0 |
| 3 | 1536.8 | 93.8 | 3.53 | 4.71 |
| 4 | 1526.3 | 93.7 | 3.58 | 9.18 |
| 5 | 1515.6 | 93.7 | 3.54 | 19.48 |
| 6 | 1514.6 | 93.6 | 3.71 | 30.69 |
| 7 | 1514.1 | 93.5 | 3.69 | 39.22 |
| 8 | 1487.4 | 93.4 | 3.73 | 51.17 |
| 9 | 1489.5 | 93.8 | 3.2 | 0 |
| 10 | 1514.6 | 93.8 | 3.14 | 0 |
| 11 | 1502.1 | 93.6 | 3.29 | 5.64 |
| 12 | 1493.3 | 93.6 | 3.02 | 12.2 |
| 13 | 1494.6 | 93.6 | 3.24 | 21.47 |
| 14 | 1475.6 | 93.3 | 3.59 | 48.8 |
| 15 | 1469.1 | 93.2 | 3.39 | 71.22 |

Referring to [Table 3], the Vickers hardness ($H_V$) was measured, by pressing with a square base diamond pyramid indenter consisting of a 136 degree included angle between opposite faces under 10 kg load, and measuring a diagonal line of the concave portion. At this time, the descending speed of the indenter was 150 μm/s, and 15 seconds of indentation time was maintained.

For the Rockwell hardness ($H_{Ra}$) of [Table 3], a steel ball of a predetermined shape or a diamond cone-shaped indenter was used to exert an initial reference load, after which the load was increased to test load (60 kgf in the measuring of the present disclosure). The load was then returned to the initial reference load. The Rockwell hardness was then defined based on the difference of depths of the two indentations, i.e., the difference between the depth under reference loading and depth of the indentation.

The fracture toughness ($K_{IC}$) in [Table 3] is measured using [Mathematical equation 1] suggested by Lawn B. R. and Fuller E. R. in "Equilibrium penny-like cracks in indentation fracture" (J. Mat. Sci. 12: 2016-2024(1975)).

$$K_{IC} = 0.0726 \times \frac{P}{C^{1.5}}$$ [Mathematical equation 1]

where, P denotes indentation load (10 kg), and c is a length of crack.

Figure 3:
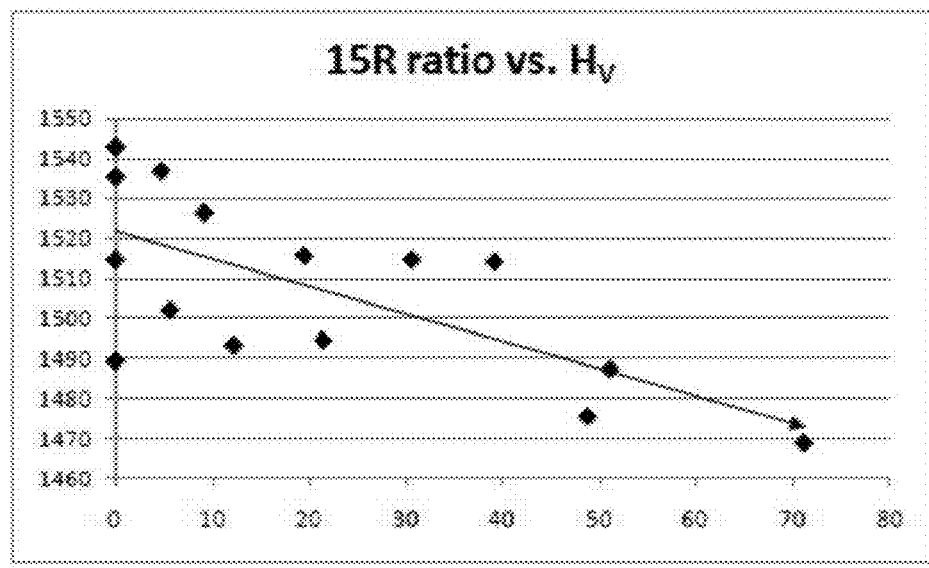
FIG. 3 shows a variation of Vickers hardness ($H_V$) according to ratio of polytype 15R.
Figure 4:
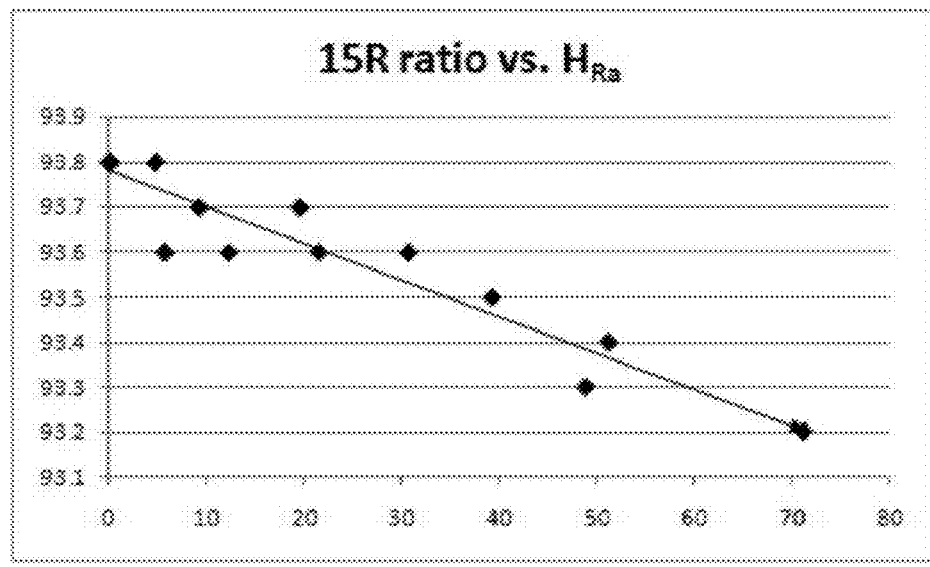
FIG. 4 shows a variation of Rockwell hardness ($H_{Ra}$) according to ratio of polytype 15R.
Figure 5:
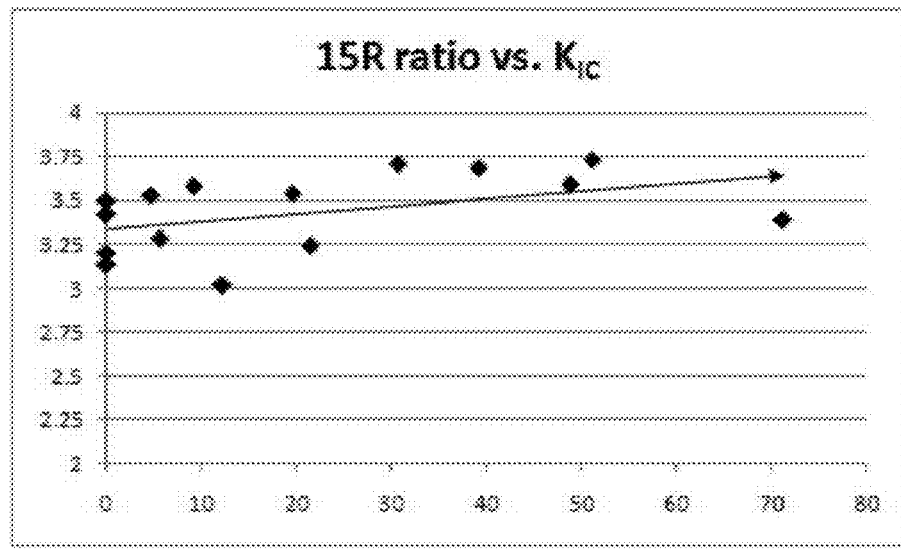
FIG. 5 shows a variation of fracture toughness ($K_{IC}$) according to ratio of polytype 15R.

FIG. 3 shows a variation of Vickers hardness ($H_V$) according to ratio of polytype 15R. FIG. 4 shows a variation of Rockwell hardness ($H_{Ra}$) according to ratio of polytype 15R. FIG. 5 shows a variation of fracture toughness ($K_{IC}$) according to ratio of polytype 15R.

Referring to FIGS. 3 and 4, the Vickers hardness ($H_V$) or the Rockwell hardness ($H_{Ra}$) shows decreasing tendency as the ratio of polytype 15R increases.

However, referring to FIG. 5, except for Example 15, it is noted that the fracture toughness ($K_{IC}$) exhibits an increasing tendency as the ratio of the polytype 15R increases.

Additionally, [Table 4] shows the brittleness index ($B_1$) and wear resistance ($R_W$) according to different ratios of polytype 15R.

TABLE 4

| No | ratio of 15R/beta (%) | $B_I (\times 10^3)$ | Rw |
|---|---|---|---|
| 1 | 0 | 4.30 | 0.66 |
| 2 | 0 | 4.42 | 0.65 |
| 3 | 4.71 | 4.27 | 0.66 |
| 4 | 9.18 | 4.18 | 0.67 |
| 5 | 19.48 | 4.20 | 0.67 |
| 6 | 30.69 | 4.00 | 0.69 |
| 7 | 39.22 | 4.02 | 0.69 |
| 8 | 51.17 | 3.91 | 0.70 |
| 9 | 0 | 4.56 | 0.63 |
| 10 | 0 | 4.73 | 0.61 |
| 11 | 5.64 | 4.47 | 0.64 |
| 12 | 12.2 | 4.85 | 0.60 |
| 13 | 21.47 | 4.52 | 0.63 |
| 14 | 48.8 | 4.03 | 0.69 |
| 15 | 71.22 | 4.25 | 0.66 |

Referring to [Table 4], the brittleness index ($B_1$) is proportional to the Vickers hardness ($H_V$), but is inversely proportional to the fracture toughness ($K_{IC}$). [Mathematical equation 2] as below is used to obtain the brittleness index ($B_1$) in [Table 4].

$$B_1 = H_V/K_{IC}$$ [Mathematical equation 2]

The wear resistance ($R_W$) in [Table 4] is an index to the frictional wear excluding chemical wear, which is inversely proportional to the Vickers hardness ($H_V$), but is proportional to the fracture toughness ($K_{IC}$). Also notable is higher sensitivity to the variation of fracture toughness ($K_{IC}$), than to the Vickers hardness ($H_V$). [Mathematical equation 3] as below is used to obtain the wear resistance ($R_W$) in [Table 4].

$$R_W = K_{IC}^{3/4}/H_V^{0.5}$$ [Mathematical equation 3]

Figure 6:
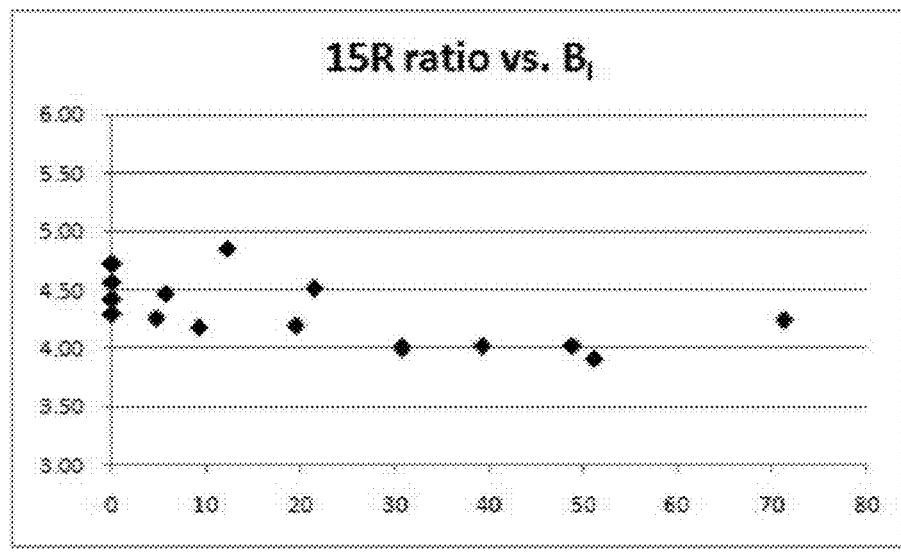
FIG. 6 shows a variation of brittleness ($B_f$) according to ratio of polytype 15R.
Figure 7:
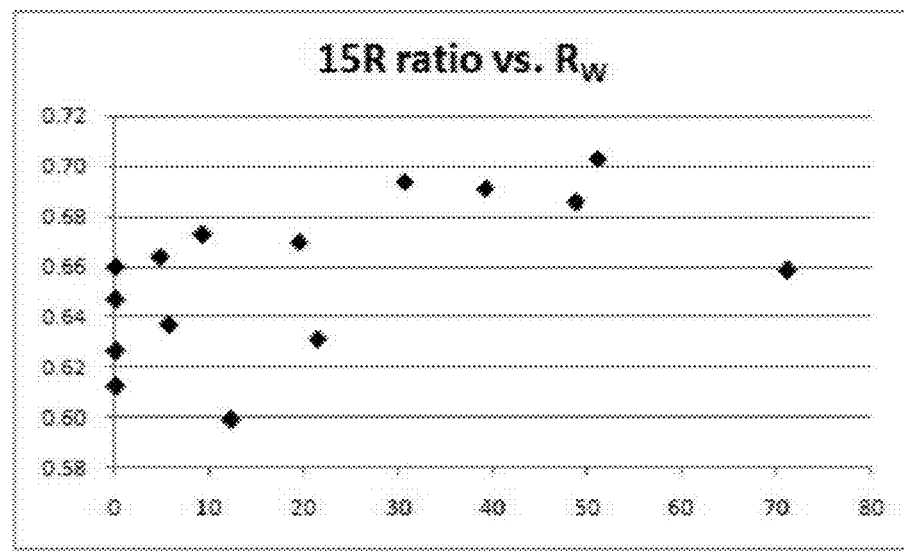
FIG. 7 shows a variation of wear resistance ($R_W$) according to ratio of polytype 15R.

FIG. 6 shows a variation of brittleness ($B_1$) according to ratio of polytype 15R. FIG. 7 shows a variation of wear resistance ($R_W$) according to ratio of polytype 15R.

Referring to [Table 4], and FIGS. 6 and 7, as the ratio of the polytype 15R phase increases, wear resistance shows increasing tendency, while brittleness index shows decreasing tendency. That is, as shown in FIG. 3, the Vickers hardness ($H_V$) shows decreasing tendency as the ratio of the polytype 15R increases, and as shown in FIG. 5 (but excluding Example 15), the fracture toughness ($K_{IC}$) shows increasing tendency as a ratio of the polytype 15R increases, which are similar to the tendencies shown in FIGS. 6 and 7.

More specifically, it is understood that a ceramic material having between 25% and 55% of a ratio of polytype 15R phase may have lower brittleness index, but have higher wear resistance than the ceramic materials including polytype 15R phase of other ranges.

In the ceramic material according to an exemplary embodiment, the amount of the polytype 15R phase may be between 25% and 55%.

For example, referring to Example 14, one will be able to predict that a cutting tool insert would exhibit good wear resistance, as it is fabricated by processing the ceramic material with high ratio of polytype 15R phase.

<Evaluation 2>

Cutting tools, i.e., inserts were fabricated with the ceramic materials prepared according to Examples 10, 11 and 14 of [Table 1]. Each insert was subject to a test with Inconel 718 by a turning, at a speed of 740 m/min, moving speed of 0.1 mm/rev, and to a cutting depth of 1.5 mm and a cutting width of 20 mm. No cutting oil was used.

The frequency of cycles of withstanding by each insert was recorded, until the flank wear depth (Vb) became 0.45 mm.

Figure 8:
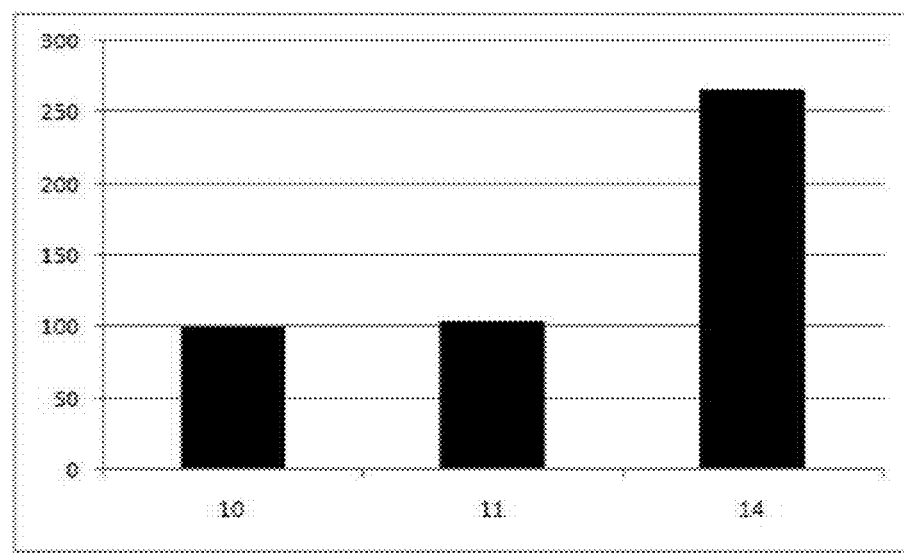
FIG. 8 shows a milling test result of a cutting tool according to an exemplary embodiment.

FIG. 8 shows a milling test result of a cutting tool according to an exemplary embodiment.

FIG. 8 is based on the life of a cutting tool of Example 10 which is used with β-sialon free of polytype 15R.

When the life of the cutting tool fabricated with β-sialon without polytype 15R is 100, the life of a cutting tool fabricated with a ceramic material (Example 11) including 5.64% polytype 15R and β-sialon can be 104.

Further, when the life of the cutting tool fabricated with β-sialon without polytype 15R is 100, the life of a cutting tool fabricated with a ceramic material (Example 14) including 48.8% polytype 15R and β-sialon can be 266.

As indicated by the milling test result of FIG. 8, it is notable that the cutting tool fabricated with a ceramic material of Example 14 with the higher ratio of polytype 15R exhibits longest life. In other words, it is understood that the cutting tool fabricated with the ceramic material of Example 14 of higher polytype 15R ratio exhibits higher wear resistance than the cutting tool fabricated with the ceramic material of Example 11 with lower polytype 15R ratio, and also exhibits better wear resistance than the cutting tool fabricated with the ceramic material of Example 10 which is free of polytype 15R.

The milling test result of FIG. 8 reveals that the tendency is in agreement with that exhibited by [Table 4] and FIG. 7.

Those with ordinary knowledge in the technical field of the present disclosure will be able to understand that the present disclosure can be embodied into different and more detailed modes, without departing from the technical concept or without modifying essential characteristics thereof. Accordingly, it will be understood that the exemplary embodiments described above are only illustrative, and should not be construed as limiting. While the scope of the present disclosure is represented by the claims accompanied below, the meaning and the scope of the claims, and all the modifications or modified forms that can be derived from the equivalent concepts will have to be interpreted as falling into the scope of the present disclosure.

The invention claimed is:

1. A ceramic material consisting of:
    β-sialon ($Si_{(6-z)}Al_zO_zN_{(8-z)}$), polytype 15R, and intergranular phase, and yttrium, wherein:
    z is the substitution rate in the β-sialon, wherein $0.0<z<4.2$; and
    the polytype 15R comprises twin grains.

2. The ceramic material according to claim 1, wherein:
    an amount of the polytype 15R is between 25% and 55%, as measured as a ratio of a height in a Cu-Kα X-ray diffraction pattern of 15R peak at a 2θ value of 34° and a height in the same diffraction pattern of a β-sialon peak at a 2θ value of 33°.

3. A cutting tool for machining a chip-forming metal, comprising:
    the ceramic material according to claim 2.

4. A cutting tool for machining a chip-forming metal, comprising:
    the ceramic material according to claim 1.

5. A ceramic material comprising:
    β-sialon ($Si_{(6-z)}Al_zO_zN_{(8-z)}$), polytype 15R, and intergranular phase, and yttrium, wherein:
    z is the substitution rate in the β-sialon, wherein $0.0<z<4.2$; and
    the polytype 15R comprises twin grains.

6. The ceramic material according to claim 5, wherein:
    an amount of the polytype 15R is between 25% and 55%, as measured as a ratio of a height in a Cu-Kα X-ray diffraction pattern of 15R peak at a 2θ value of 34° and a height in the same diffraction pattern of a β-sialon peak at a 2θ value of 33°.

7. A cutting tool for machining a chip-forming metal, comprising:
    the ceramic material according to claim 6.

8. A cutting tool for machining a chip-forming metal, comprising:
    the ceramic material according to claim 5.

9. The ceramic material according to claim 5, wherein:
    $1.3 \leq z \leq 1.8$.

10. The ceramic material according to claim 9, wherein:
    $1.6 \leq z \leq 1.7$.

11. The ceramic material according to claim 5, wherein the ceramic material is devoid of Mg.

12. The ceramic material according to claim 5, comprising reaction products of $Si_3N_4$, AlN, $Y_2O_3$ and $Al_2O_3$, but not MgO.

13. A ceramic material consisting essentially of:
    β-sialon ($Si_{(6-z)}Al_zO_zN_{(8-z)}$), polytype 15R, and intergranular phase, and yttrium, wherein:
    z is the substitution rate in the β-sialon, wherein $0.0<z<4.2$; and
    the polytype 15R comprises twin grains.

14. The ceramic material according to claim 13, wherein:
    an amount of the polytype 15R is between 25% and 55%, as measured as a ratio of a height in a Cu-Kα X-ray diffraction pattern of 15R peak at a 2θ value of 34° and a height in the same diffraction pattern of a β-sialon peak at a 2θ value of 33°.

15. The ceramic material according to claim 13, wherein:
    $1.3 \leq z \leq 1.8$.

16. The ceramic material according to claim 15, wherein:
    $1.6 \leq z \leq 1.7$.

17. The ceramic material according to claim 13, wherein the ceramic material is devoid of Mg.

18. The ceramic material according to claim 13, consisting essentially of reaction products of $Si_3N_4$, AlN, $Y_2O_3$ and $Al_2O_3$.

19. The ceramic material according to claim 13, wherein each of the twin grains comprises bright bands and dark bands repeatedly stacked on one another.

20. The ceramic material according to claim 1, wherein each of the twin grains comprises bright bands and dark bands repeatedly stacked on one another.

21. The ceramic material according to claim 5, wherein each of the twin grains comprises bright bands and dark bands repeatedly stacked on one another.

* * * * *